United States Patent
Leggett

(10) Patent No.: US 7,780,211 B2
(45) Date of Patent: Aug. 24, 2010

(54) TAILGATE LIFTER

(76) Inventor: James Francois Leggett, 1131 N. 26th St., Tacoma, WA (US) 98403

(*) Notice: Subject to any disclaimer, the term of this patent is extended or adjusted under 35 U.S.C. 154(b) by 70 days.

(21) Appl. No.: 12/315,298

(22) Filed: Dec. 2, 2008

(65) Prior Publication Data

US 2010/0133869 A1 Jun. 3, 2010

(51) Int. Cl.
*B65G 7/12* (2006.01)
(52) U.S. Cl. ...................................................... 294/26
(58) Field of Classification Search ............... 294/24, 294/26, 27.1; 296/57.1; 49/389
See application file for complete search history.

(56) References Cited

U.S. PATENT DOCUMENTS

| | | | |
|---|---|---|---|
| 2,430,142 A * | 11/1947 | Roberts | ........................ 294/26 |
| 4,266,821 A | 5/1981 | Gillet | |
| 4,463,977 A * | 8/1984 | Wyatt | ........................... 294/26 |
| 4,709,840 A | 12/1987 | Allen | |
| D327,044 S | 6/1992 | Smith | |
| 5,358,301 A | 10/1994 | Konchan | |
| D423,309 S * | 4/2000 | Sirmans | ......................... D8/14 |
| 6,695,556 B2 * | 2/2004 | Addy | ............................. 410/97 |

* cited by examiner

*Primary Examiner*—Paul T Chin
(74) *Attorney, Agent, or Firm*—James F. Leggett

(57) ABSTRACT

A pick-up truck tailgate lifter having dual hooks for gripping the bottom of the rear of the tailgate and lifting straps affixed thereto and running to the inside of the tailgate ending in a handle. One embodiment has a roll-up handle so the straps and handle fit through the space between the bed and the tailgate. The other routes the straps over the rear face of the tailgate, through a top cap and around a reversing post in the inside of the tailgate so that when lifting pressure is applied to the handle, the straps tighten the lifting hooks.

3 Claims, 6 Drawing Sheets

TAILGATE LIFTER

BACKGROUND OF THE INVENTION

This invention relates generally to an improved device to assist in the removal of standard full-sized pick-up truck tailgates, which removably attaches a handle on the inside face of the tailgate. Various reasons present themselves, such as sliding a camper into the bed of a pickup, which require the removal of the tailgate. Two obstacles present themselves for a lone person to remove a tailgate from a pick-up truck. First, the tailgate is heavy and unwieldy as there is no natural handhold on the inside face of the tailgate to stabilize the tailgate to keep the ends level and the bottom edge of the tailgate is relatively sharp so is not a useful handhold. The height of the full-sized tailgate is such that a person's arm cannot reach the bottom of the tailgate inside the bed when attached and there is insufficient space to insert a hand between the bottom of the tailgate and the bed of the pickup. Second, the tailgate is painted so that any contact of the bottom edge of the tailgate with the truck bumper or the ground will result in damage to the paint and resultant rusting of the tailgate.

Although there have been numerous attempts to make it easier to control tailgates, such as J. F. Konchan's U.S. Pat. No. 5,358,301 and R. S. Sunila's U.S. Pat. No. 6,767,173, only B. R. Sovoda's U.S. Pat. No. 5,711,569 address the problem of carrying the tailgate by forming a handle at the bottom of the inside face of the tailgate. Unfortunately, none of these efforts satisfies the need for a removable handle to assist a lone individual to remove and carry a tailgate.

It is an object of this invention to provide an inexpensive, portable handle for tailgates, which is not permanently attached to the tailgate, requires no physical modification to the tailgate, and will attach to modern full-sized pickup tailgates so as to allow their removal and installation by a lone individual.

Other objects, features and advantages of the invention will be apparent from the drawings, the specification and the claims.

SUMMARY OF INVENTION

This invention satisfies these objects in that it is comprised of a pair of non-marring hooks of sufficient size to engage the bottom of the rear face of a full-sized pick-up tailgate, properly spaced apart to allow stability of the tailgate when lifting force is applied, a strap attached to each of the hooks which threads either between the bed and the bottom of the tailgate in one embodiment of the invention, or over the top of the tailgate in the alternative embodiment, and communicates to a handle inside of the tailgate. Because of the limited distance between the truck bed and the bottom of the tailgate, the first embodiment of the invention is equipped with a roll-up handle.

The novel features of the invention will be best understood from the following description in light of the accompanying drawings. While particular embodiments of the present invention are shown and described, it will be obvious to those skilled in the art that changes and modifications may be made without departing from this invention in its broader aspects and, therefore, the aim of the appended claims is to cover all such changes and modifications as fall within the true spirit and scope of this invention.

DESCRIPTION OF THE PREFERRED EMBODIMENTS

Figure 1:
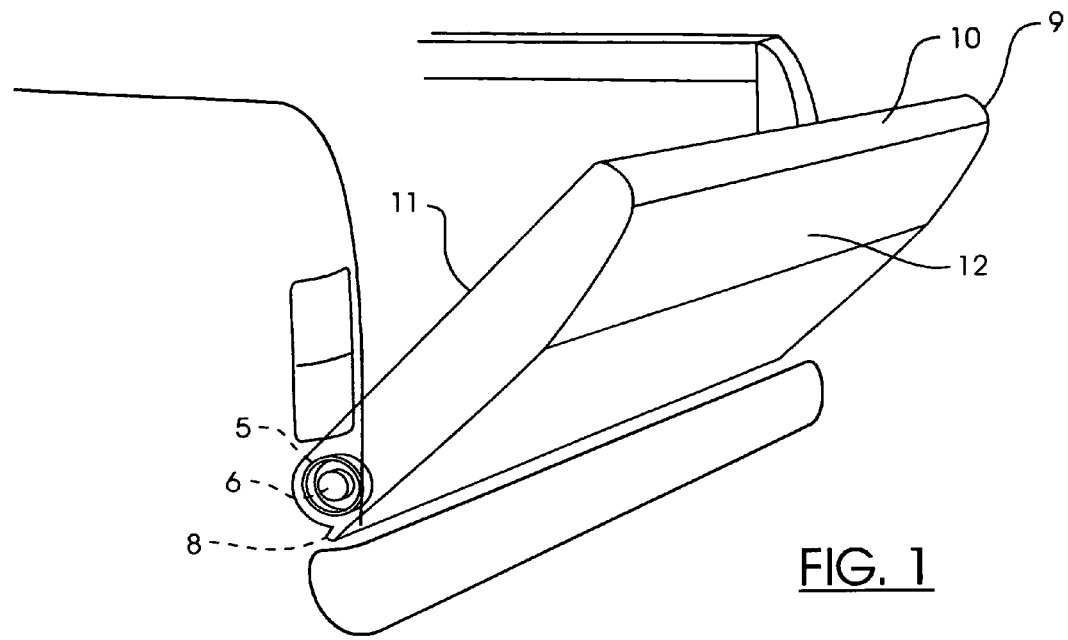
FIG. 1 is a view of the driver's side of a standard full-sized pick-up tailgate.
Figure 2:
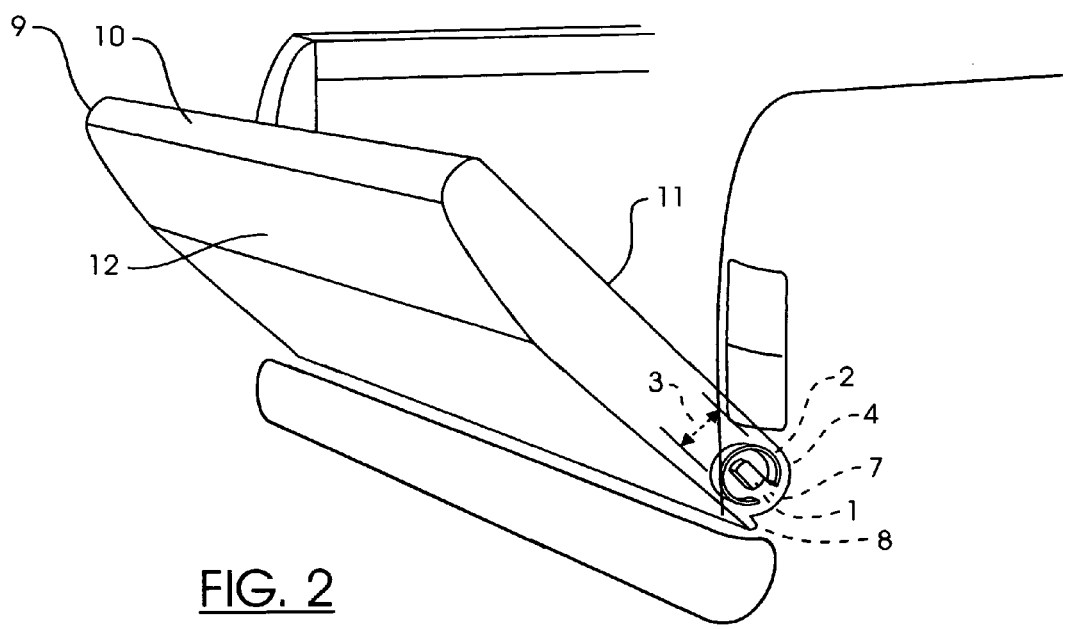
FIG. 2 is a view of the passenger's side of a standard full-sized pick-up tailgate.
Figure 4:
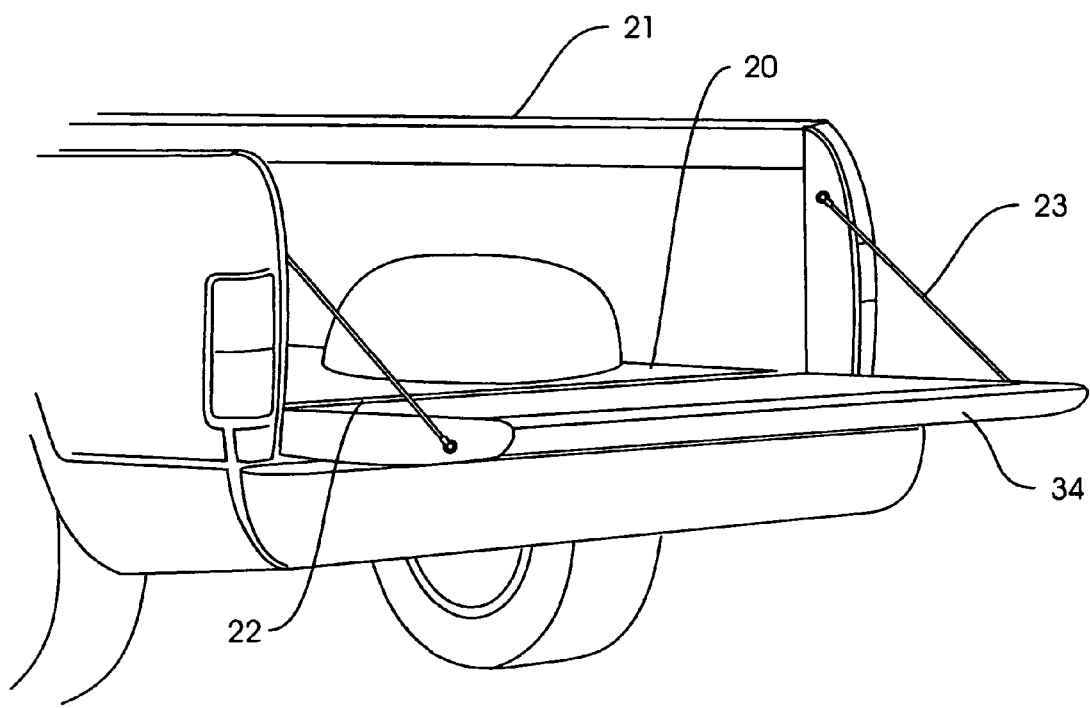
FIG. 4 is a left side perspective view a standard full-sized pick-up with its tailgate down.

With reference to FIGS. 1, 2 and 4, the tailgate (34) is shown as normally attached to the truck bed (20) of a full-sized pick-up truck, having a driver's side and a passenger's side. The tailgate (34) rotates around two hinge points, a slot post (1) and a round post (6), located at the bottom of the rear of the sidewalls of the pick-up box (21) and is restrained in rotation by removable tailgate cables (23). It should be noted that when the tailgate is in the raised and locked position, there is nearly no space between the truck bed (20) and the bottom of the tailgate (4), but when the tailgate is rotated to the rear, a small space opens up between the truck bed and the bottom of the tailgate (22). This space is not of sufficient dimension to allow the passage of other than very thin objects. The tailgate is comprised of an external sheet metal skin over a heavier metal frame, being wider than it is high, having a top (10), bottom (4), inside surface (11) and rear surface (12). The bottom of the rear surface (12) of the tailgate ends in a relatively sharp edge (8) which mates to the truck bed when fully closed. The left end of the tailgate has a collar (5) at its bottom (4) which slips over the round post (6) on the side of the truck bed. The passenger's end of the tailgate has a slotted collar (2) which is provided with an opening (7) in its circumference to allow passage of the slotted end of the post (1) on the passenger's side of the truck bed. Both collars have a diameter (3) slightly greater than that of the posts so that the collars smoothly rotate around the posts. The method of removal of the tailgate (34) from the truck bed (20) requires unlatching the tailgate and rotating it slightly aft and down to expose the attachment points of the cables (23), detaching the cables, then aligning the opening (7) in the slotted collar (2) with the narrowest dimension of the slot post (1) and disengaging the slotted collar (2) from the slot post, thence, while supporting the weight of the tailgate, moving the tailgate horizontally to the right until the round post (6) is extracted from the collar (5). The tailgate is now free of the truck and can be carried away.

Figure 3:
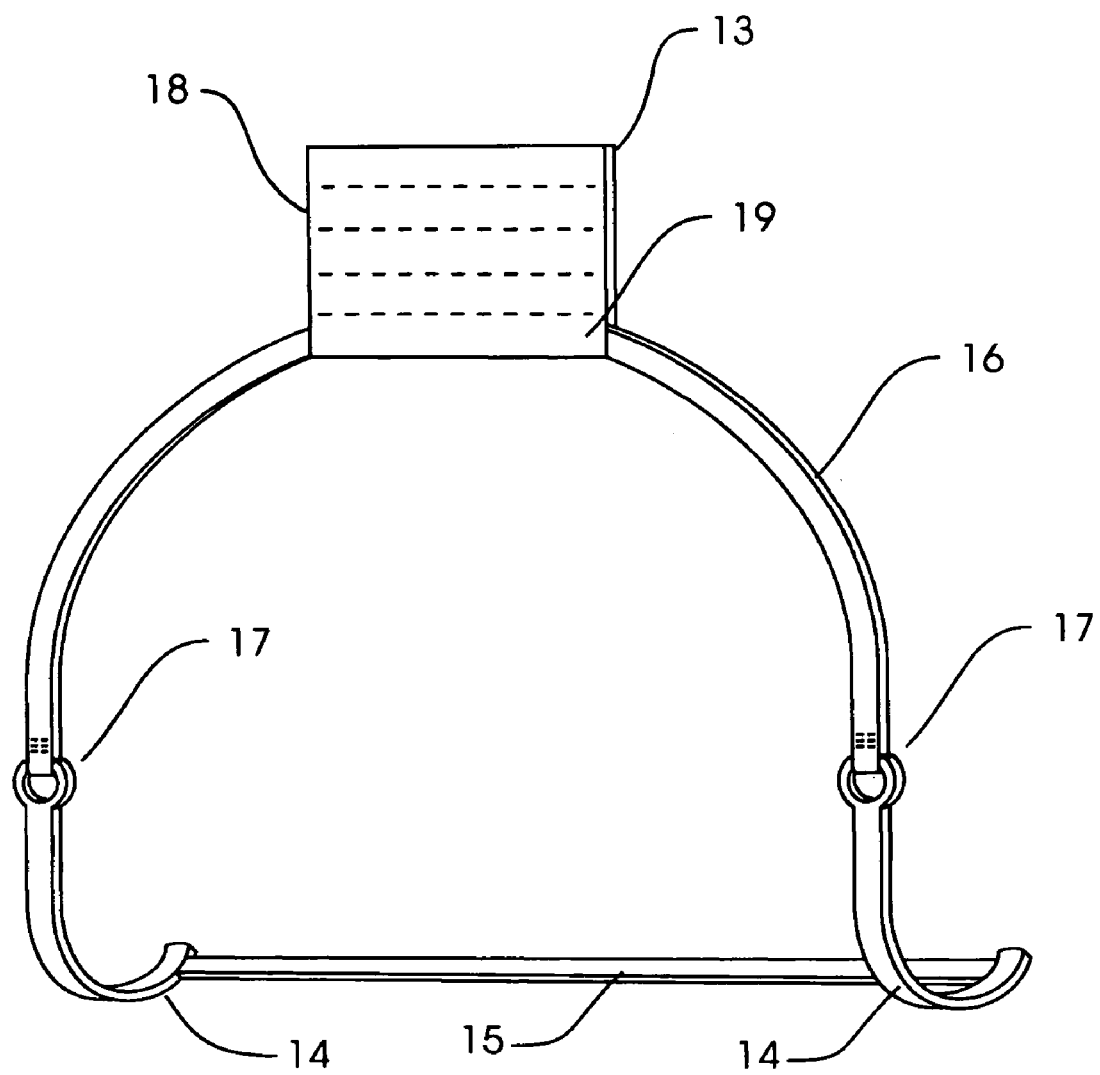
FIG. 3 is rear perspective view of the invention with a roll-up handle.

With reference to FIG. 3, the side of the preferred embodiment of the Tailgate Lifter which faces the tailgate is shown. This embodiment of the Tailgate Lifter is comprised of two rigid hooks (14), having a non-marring coating and being of sufficient internal diameter to engage the bottom edge (8) of the tailgate, to which a strap (16) is connected (17) and midway along the length of the strap (16) is a roll-up handle (18) provided with a slot (19) at one end to receive the strap (16) and being of sufficient width and length so that when it wraps around the strap it provides a well cushioned hand-hold for an individual removing or installing the tailgate. A spacer (15), of non-marring and rigid material, communicates between the hooks (14) so that the two hooks (14) are of sufficient distance from one another so that the tailgate is relatively stable longitudinally when free of the truck bed (20).

Figure 8:
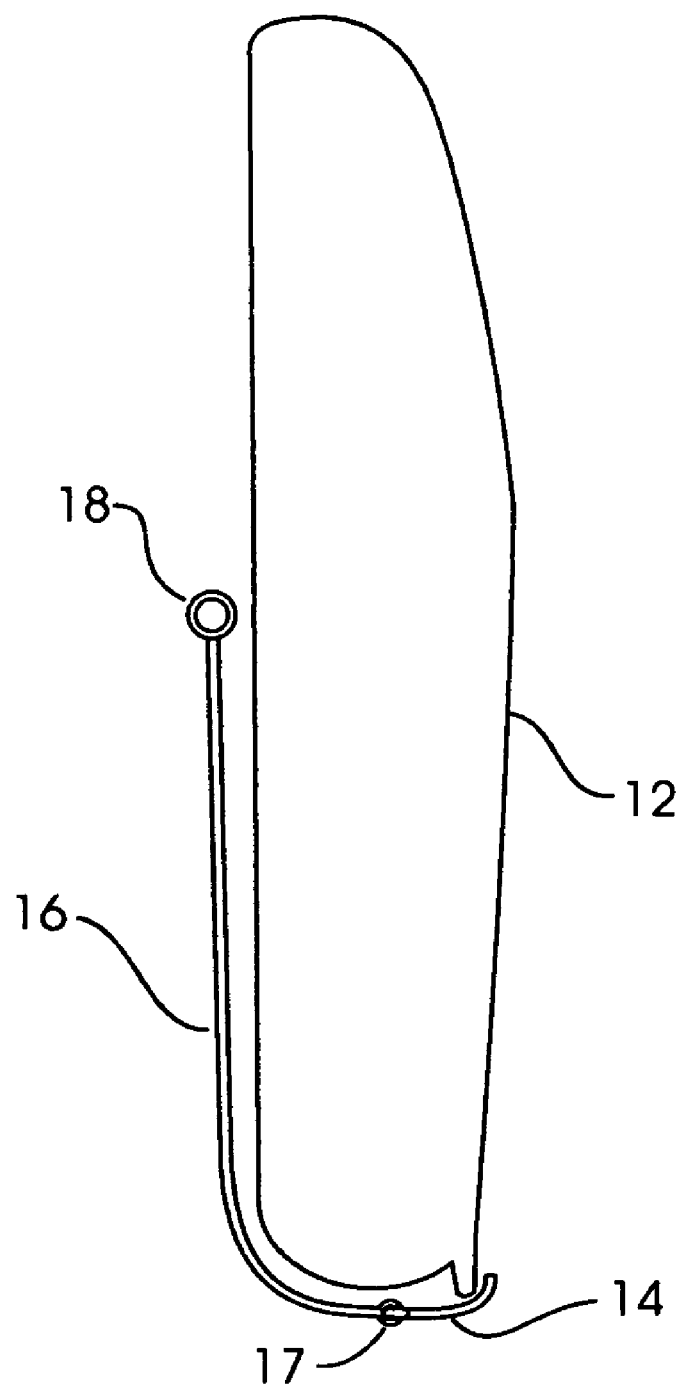
FIG. 8 is a view of the preferred embodiment installed on a tailgate.

With reference to FIG. 8, to install the Tailgate Lifter, the tailgate is unlatched from the top of the pick-up box (21) and rotated downward to expose the opening between the truck bed and the bottom of the tailgate (22). The Tailgate Lifter, with the roll-up handle (18) unrolled, is threaded through this opening (22) along with the strap (16) until the hooks (14) engage the extended bottom edge (8) of the rear surface of the tailgate. The roll-up handle (18) is then rolled up around the strap and lifting pressure is applied via this handle by one hand to lift the tailgate free of the truck bed, while the other hand stabilizes the tailgate from the rear of the truck. Once free of the truck, the tailgate can be carried by the handle with the rear surface of the tailgate against the individual's body.

Figure 5:
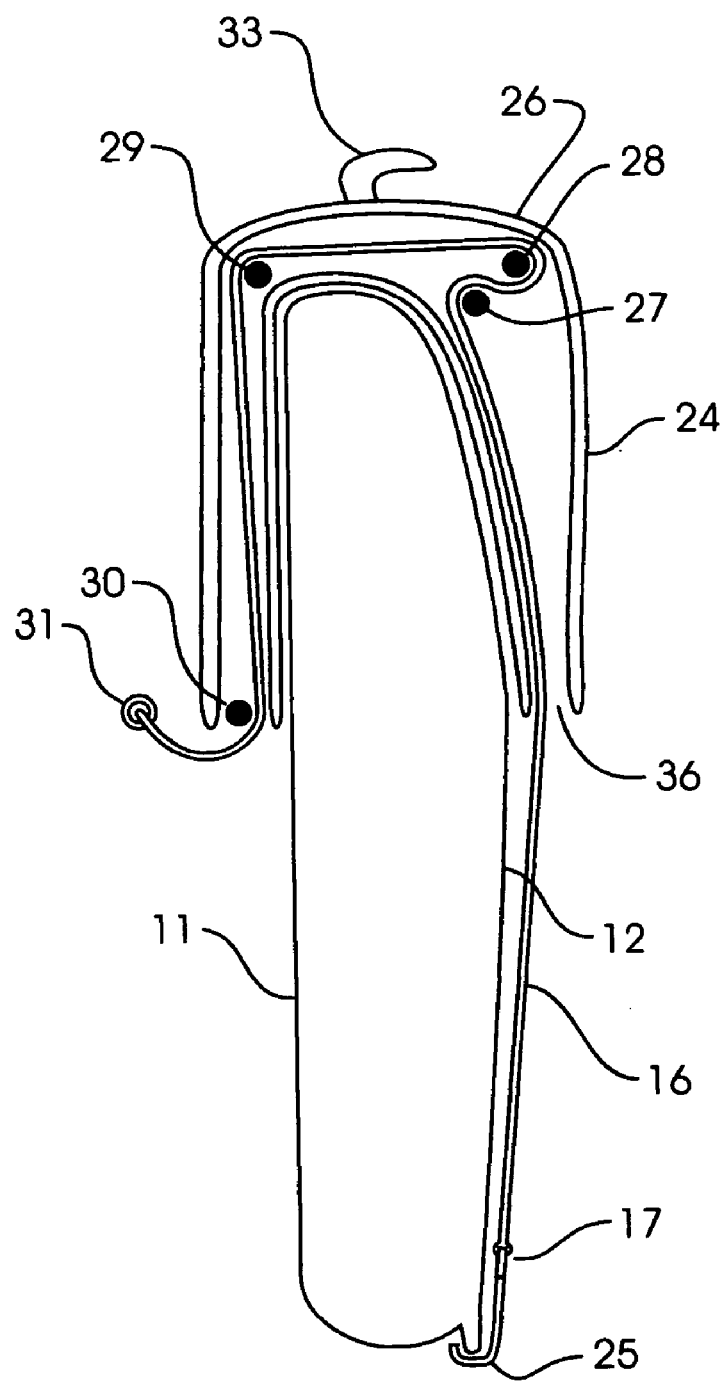
FIG. 5 is a side cross-sectional view of an alternative embodiment of the invention with the strap routed over the top of the tailgate.
Figure 6:
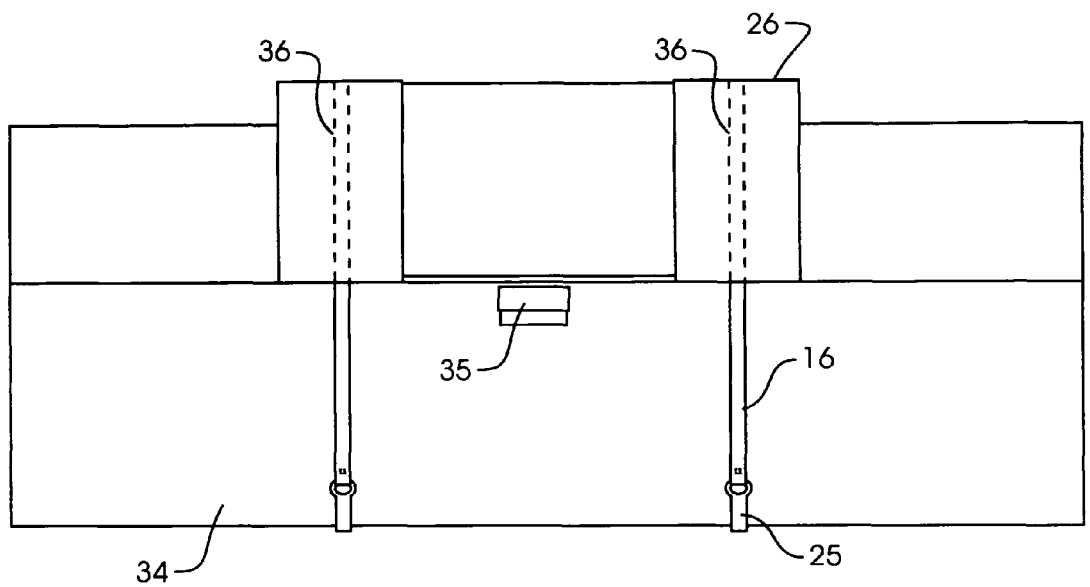
FIG. 6 is rear view of a tailgate with the alternative embodiment attached.
Figure 7:
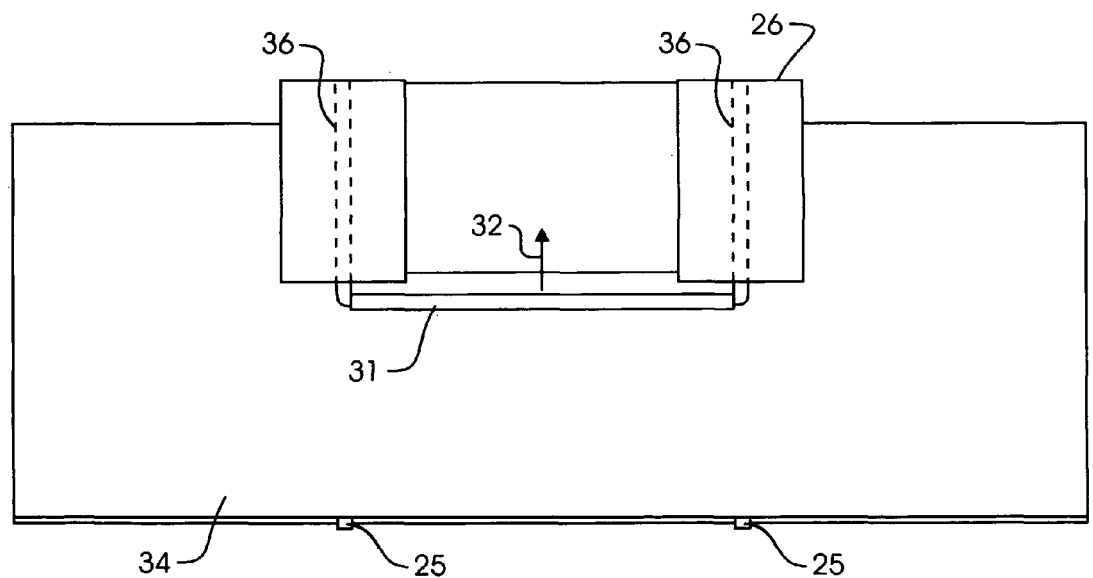
FIG. 7 is front view a tailgate with the alternative embodiment attached.

With reference to FIGS. 5, 6 & 7, an alternative embodiment of the tailgate lifter, being an external lifter (24), is shown as installed on a tailgate being comprised of two non-marring bottom hooks (25), of sufficient dimension to engage the bottom edge (8) of the rear surface (12) of the tailgate (34), to which straps (16) are connected (17) at the end opposite to that which engages at the bottom edge (8), which straps each run the height of the tailgate on either side of the tailgate latch handle (35), into a top cap (26) which sets snugly over the top of the tailgate (10) and extends down the inside surface (11) to a point just above the tailgate's center of gravity and has within its length a channel (36) for each of the straps (16), one located within the driver's side and one located within the passenger's side of the top cap (26), bounded by a first guide post (27) which is provided with spring means to apply tension to the strap, which strap passes on the side of the first guide post (27) to the front of the tailgate and continues over said first guide post (27) to the rear then upward in the channel to pass around the rear side of a second guide post (27) on the side to the rear of the tailgate, which second guide post (28) is located within the channel in the top cap above the top of the tailgate, which strap passes over the top of said second guidepost (28) and continues across the top of the tailgate to pass over the top of a third guidepost (29) located in the channel inside the top cap at the same level as the second guide post (28) and on the front side of the tailgate, and passes downward along the top cap on the inside surface (11) of the front side of the tailgate and passes over the rear side of a fourth guide post (4) located at the front end of the channel and exits the channel and the top cap and terminates at and is attached to one end of a single handle (31) to which the strap from the other bottom hook (25) also is attached and terminates, such that when upward pressure is applied to the handle (31), the straps (16) are pulled through the top cap (26) and the bottom hooks (25) are tightened (32) against the bottom edge (8) of the rear surface of the tailgate. Tie downs (33) or other load or safety devices can be installed on this top cap (26).

The foregoing disclosure and description of the invention are illustrative and explanatory thereof and, it will be understood by those skilled in the art that various changes in the size, shape and materials, as well as in the details of the illustrated construction, may be made within the scope of the appended claims without departing from the scope or spirit of the invention.

I claim:

1. An improved tailgate lifter device for manually removing and re-installing a full size pickup truck tailgate which attaches to the pickup box by means of a post and collar hinge wherein one post is slotted and one collar has an opening through which the slotted post can be removed thus freeing one side of the tailgate so the collar on the other side of the tailgate can be withdrawn from the post to completely free the tailgate from the truck and the process can be reversed to reinstall the tailgate on the truck, which tailgate lifter device is comprised of two rigid hooks, of sufficient internal diameter to engage the bottom edge of the tailgate, a spacer of rigid material communicating between the hooks so that the two hooks are of sufficient distance from one another so that the tailgate is relatively stable longitudinally when free of the truck bed, a strap connected between the ends of the hooks opposite from the end of the hook which engages the bottom edge of the tailgate, and midway along the length of the strap a roll-up handle provided with a slot along one end to receive the strap and being of sufficient width and length so that when it wraps around the strap it provides a well cushioned handhold for an individual removing or installing the tailgate, and the material of said roll-up handle and strap are of such thickness so as to be able to fit through the opening between the tailgate and the truck bed when the tailgate is opened.

2. An improved tailgate lifter device for manually removing and re-installing a full size pickup truck tailgate which attaches to the pickup box by means of a post and collar hinge wherein one post is slotted and one collar has an opening through which the slotted post can be removed thus freeing one side of the tailgate so the collar on the other side of the tailgate can be withdrawn from the post to completely free the tailgate from the truck and the process can be reversed to reinstall the tailgate on the truck, which tailgate lifter device is comprised of two bottom hooks, of sufficient dimension to engage the bottom edge of the rear surface of the tailgate, to which straps are connected at the end opposite to that which engages the bottom edge, which straps each run the height of the tailgate on either side of a tailgate latch handle, into a top cap which sets snugly over the top of the tailgate and extends down the inside surface to a point just above the tailgate's center of gravity, being comprised of an inner and outer surface with a space in between having a channel for each of the straps through its length, said channel, one through the driver's side and one through the passenger's side fo the top cap, containing within its length a first guide post means, which spans the channel perpendicular to the length of the strap, located near the top of the top cap in the front of the channel on the rear side of the tailgate and below the top of the tailgate, the strap passing on the front side of said first guidepost and across the top of said first guidepost then upward to a second guide post means, said first guide post being provided with a spring means to apply tension to the strap, which strap continues upward in the channel to pass around the rear side of the second guide post means, which is located within the channel above and slightly to the rear of the first guide post and above the top of the tailgate, being still to the rear of the rear of the tailgate, and said strap passes of the top of the second guide post and continues across the top of the tailgate to pass over the top of a third guidepost means, which is located inside the top cap on the front side of the tailgate at the same level as the second guide post, and the strap passes downward the length of the top cap on the front side of the tailgate and passes over the rear side of a fourth guidepost means, located within the channel at the bottom of the top cap on the inside of the tailgate, and said strap exits the top cap and terminates and is affixed to one end of a single handle to which other end the strap from the opposite bottom hook is affixed and terminates, such that when upward pressure is applied to the handle the straps are pulled through the top cap and the bottom hooks are pulled tight against the bottom edge of the rear surface of the tailgate.

3. An improved tailgate lifter device for manually removing and re-installing a full size pickup truck tailgate as in claim 2 wherein tie down devices are installed on the top cap.

\* \* \* \* \*